United States Patent
Kweon et al.

(10) Patent No.: US 9,304,245 B2
(45) Date of Patent: Apr. 5, 2016

(54) DISPLAY DEVICE INCLUDING A LIGHT GUIDE BONDED TO A DISPLAY PANEL

(71) Applicant: LG Display Co., Ltd., Seoul (KR)

(72) Inventors: Young Min Kweon, Paju-si (KR); Young Nam Lee, Incheon (KR); Chang Soo Jang, Goyang-si (KR); Du-Ho Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 59 days.

(21) Appl. No.: 14/143,672

(22) Filed: Dec. 30, 2013

(65) Prior Publication Data

US 2014/0320784 A1    Oct. 30, 2014

(30) Foreign Application Priority Data

Apr. 30, 2013  (KR) .......................... 10-2013-0048480

(51) Int. Cl.
| | | |
|---|---|---|
| *G02F 1/1335* | (2006.01) | |
| *G02F 1/1339* | (2006.01) | |
| *F21V 8/00* | (2006.01) | |

(52) U.S. Cl.
CPC ............ *G02B 6/0055* (2013.01); *G02B 6/0033* (2013.01); *G02B 6/0038* (2013.01); *G02F 1/133615* (2013.01); *G02F 1/133605* (2013.01); *G02F 2001/133607* (2013.01); *G02F 2202/28* (2013.01)

(58) Field of Classification Search
CPC .................... G02F 1/133315; G02F 1/133605; G02F 1/133604; G02F 1/133608; G02F 1/1339; G02F 1/1341; G02F 1/1345; G02F 2001/13415; G02B 6/0068; G02B 6/0038; G02B 6/0055; G02B 6/0036; G02B 6/0031
USPC ....................... 349/65, 67, 113, 153, 190, 155
See application file for complete search history.

(56) References Cited

U.S. PATENT DOCUMENTS

| | | | |
|---|---|---|---|
| 2004/0135936 A1* | 7/2004 | Lee ................................. | 349/64 |
| 2007/0279551 A1* | 12/2007 | Umebayashi ................... | 349/65 |
| 2008/0049168 A1 | 2/2008 | Kubota | |
| 2008/0055925 A1 | 3/2008 | Masamoto et al. | |
| 2008/0129927 A1* | 6/2008 | Hamada et al. ................. | 349/65 |
| 2009/0079894 A1 | 3/2009 | Okuda | |
| 2010/0296314 A1* | 11/2010 | Segawa ......................... | 362/616 |
| 2012/0081395 A1 | 4/2012 | Adi et al. | |
| 2012/0113331 A1 | 5/2012 | Takata | |
| 2014/0347600 A1* | 11/2014 | Yun et al. ........................ | 349/62 |

FOREIGN PATENT DOCUMENTS

| | | |
|---|---|---|
| CN | 1480746 A | 3/2004 |
| CN | 1811549 A | 8/2006 |
| EP | 1170623 A2 | 1/2002 |
| JP | 311502 A | 1/1991 |
| JP | 3-89295 A | 4/1991 |

(Continued)

*Primary Examiner* — Mike Qi
(74) *Attorney, Agent, or Firm* — Dentons US LLP (57) ABSTRACT

Disclosed is a display device having a slim and narrow structure. The display device comprises a liquid crystal panel; a light source for providing light to the liquid crystal panel; a light guide of a glass material, wherein the light source is combined with one side of the light guide; a reflector formed on at least one of both surfaces of the light guide; and an adhesive member formed on one surface of the light guide confronting the liquid crystal panel, and provided to attach the liquid crystal panel and the light guide to each other.

16 Claims, 8 Drawing Sheets

(56) References Cited

FOREIGN PATENT DOCUMENTS

| | | |
|---|---|---|
| JP | 3204683 A | 9/1991 |
| JP | 8-334765 A | 12/1996 |
| JP | 11-174417 A | 7/1999 |
| JP | 2007-242410 A | 9/2007 |
| JP | 2009224076 A | 10/2009 |
| JP | 201033861 A | 2/2010 |
| JP | 2012-159695 A | 8/2012 |
| TW | 200611010 A | 4/2006 |
| TW | 201241513 A1 | 10/2012 |
| TW | 201310091 A1 | 3/2013 |
| TW | 201312181 A1 | 3/2013 |
| WO | 2008047785 A1 | 4/2008 |
| WO | 2008/066066 A1 | 6/2008 |
| WO | 2008/117960 A1 | 10/2008 |
| WO | WO 2008/117960 A1 * 10/2008 ............ G02F 1/1333 |

\* cited by examiner

FIG. 1

Related Art

FIG. 7B

DISPLAY DEVICE INCLUDING A LIGHT GUIDE BONDED TO A DISPLAY PANEL

CROSS REFERENCE TO RELATED APPLICATIONS

This application claims the benefit of the Korean Patent Application No. 10-2013-0048480 filed on Apr. 30, 2013, which is hereby incorporated by reference for all purposes as if fully set forth therein.

BACKGROUND OF THE INVENTION

1. Field of the Disclosure

Embodiments of the present invention relate to a display device having a slim and narrow structure.

2. Discussion of the Related Art

Figure 1:
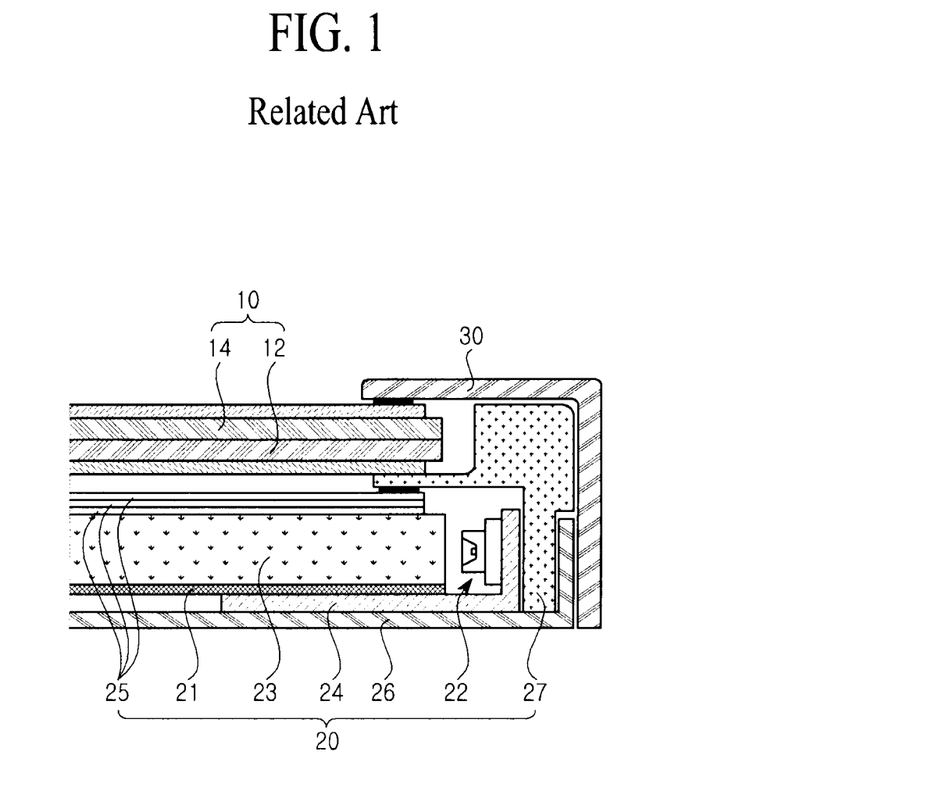
FIG. 1 is a cross sectional view illustrating a related art LCD device.

A related art liquid crystal display (LCD) device displays an image by controlling a light transmittance of liquid crystal having dielectric anisotropy through the use of electric field. To this end, in FIG. 1 illustrates a cross sectional view of the related art LCD device. The related art LCD device may include a liquid crystal panel 10, a backlight unit 20, and a case top 30.

In detail, the liquid crystal panel 10 includes a thin film transistor substrate 12 and a color filter substrate 14 confronting each other, wherein the two substrates 12 and 14 are bonded to each other with a liquid crystal layer interposed therebetween.

Also, a polarizing member (not shown) may be attached to each of lower and upper surfaces of the liquid crystal panel 10.

The backlight unit 20 may include a reflective sheet 21, a light source 22 for providing light to the liquid crystal panel 10, a light guide plate 23, a housing 24 for supporting the light source 22, a plurality of optical sheets 25, a cover bottom 26, and a guide panel 27.

In detail, the reflective sheet 21 reflects light leaking in the light guide plate 23 toward the liquid crystal panel 10.

The light source 22 includes a light emitting diode (y7) package, and a printed circuit board for supplying power to the LED package.

The housing 24 is provided to support the light source 22. The light source 22 may be combined with a lateral side of the housing 24.

The light guide plate 23 guides light, which is emitted from the light source 22, toward the liquid crystal panel 10, wherein the light guide plate 23 is formed of PMMA (Poly Methyl MethAcrylate) or glass material.

The plurality of optical sheets 25 diffuse and concentrate the light passing through the light guide plate 23, and then provides the light to the liquid crystal panel 10.

The cover bottom 26 prepares a space for receiving the light source 22, the reflective sheet 21, the light guide plate 23 and the plurality of optical sheets 25 therein, and simultaneously supports the guide panel 27.

The guide panel 27 supports the liquid crystal panel 10. As shown in FIG. 1, the guide panel 27 may include a panel supporter for supporting the liquid crystal panel 10, and a sidewall for covering the backlight unit 20.

The case top 30 covers an upper edge of the liquid crystal panel 10, and also covers lateral surfaces of the cover bottom 26 and the guide panel 27.

Referring to FIG. 1, the related art LCD device includes structures such as the cover bottom 26, the guide panel 27 and the case top 30, and also includes the plurality of optical sheets 25, whereby the related art LCD device is increased in its thickness and bezel.

SUMMARY OF THE INVENTION

Accordingly, embodiments of the present invention are directed to a display device that substantially obviates one or more problems due to limitations and disadvantages of the related art.

An aspect of embodiments of the present invention is to provide a display device which eliminates structures such as a case top, a guide panel and a cover bottom, and includes a light guide formed as one body with a liquid crystal panel.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a display device that may include a liquid crystal panel; a light source for providing light to the liquid crystal panel; a light guide of a glass material, wherein the light source is combined with one side of the light guide; a reflector formed on at least one of both surfaces of the light guide; and an adhesive member formed on one surface of the light guide confronting the liquid crystal panel, and provided to attach the liquid crystal panel and the light guide to each other.

At this time, the reflector is formed of a metal compound of any one of MoTi and AlNd, and the reflector regularly reflects the light to the liquid crystal panel, or scatters and reflects the light to the liquid crystal panel.

Also, the reflector may include a first reflection member, combined with the other surface of the light guide, for regularly reflecting the light being incident on the light guide; a plurality of pattern holes formed inside the first reflection member; and a second reflection member, formed of a material with white and provided to cover the first reflection member, for scattering and reflecting the light being incident through the plurality of pattern holes.

Furthermore, the reflector may include an optical pattern formed on one surface of the light guide confronting the liquid crystal panel.

Also, the reflector may include a plurality of reflection patterns formed on at least one of both surfaces of the light guide, wherein the reflection patterns are formed of an organic material.

In addition, the reflector may include a reflection member formed on the other surface of the light guide so as to cover the plurality of reflection patterns.

At this time, the reflection member is formed of a metal compound of any one of MoTi and AlNd, and the reflection member regularly reflects the light to the liquid crystal panel, or scatters and reflects the light to the liquid crystal panel.

The reflection member may includes a first reflection member, combined with the other surface of the light guide, for regularly reflecting the light being incident on the light guide; a plurality of pattern holes formed inside the first reflection member; and a second reflection member, formed of a material with white and provided to cover the first reflection member, for scattering and reflecting the light being incident through the plurality of pattern holes.

In another aspect of embodiments of the present invention, there is provided a display device that may include a liquid crystal panel; a light source for providing light to the liquid crystal panel; a plurality of light guides formed of a glass material, wherein the light source is combined with one side of any one of the light guides; a reflector formed on at least one of both surfaces of any one among the plurality of light guides; and an adhesive member formed on one surface of the light guide confronting the liquid crystal panel, and provided to combine the liquid crystal panel with the plurality of light guides.

At this time, the plurality of light guides may include a first light guide member combined with a lower surface of the liquid crystal panel, wherein the adhesive member is combined with one surface of the first light guide member confronting the liquid crystal panel; and a second light guide member combined with a lower surface of the first light guide member, wherein the reflector is formed on at least one of both surfaces in any one of the first and second light guide members.

Also, the reflector may include a plurality of first reflection patterns formed on at least one surface of both surfaces of the first light guide member; and a plurality of second reflection patterns formed on at least one surface of both surfaces of the second light guide member, wherein the plurality of first and second reflection patterns are formed of an organic material.

Also, the reflector further includes a reflection member formed on the other surface of the second light guide member.

The reflection member is formed of a metal compound of any one of MoTi and AlNd, and the reflection member regularly reflects the light to the liquid crystal panel, or scatters and reflects the light to the liquid crystal panel.

The reflection member may includes a first reflection member, combined with the other surface of the second light guide member, for regularly reflecting light being incident on the second light guide member; a plurality of pattern holes formed inside the first reflection member; and a second reflection member, formed of a material with white and provided to cover the first reflection member, for scattering and reflecting the light being incident through the plurality of pattern holes.

Also, the light source may include a plurality of LED packages for providing the light to the liquid crystal panel; and a power supply member provided with a receiving area to be combined with the plurality of LED packages, wherein the power supply member is combined with the rear surface of the light guide.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Also, various elements included in the present invention may be described by the use of terms such as first, second elements and etc. However, the elements of the present invention are not limited to these terms. These terms are used only to differentiate one element from other elements.

Hereinafter, embodiments of the present invention will be described in detail with reference to the accompanying drawings.

Figure 2A:
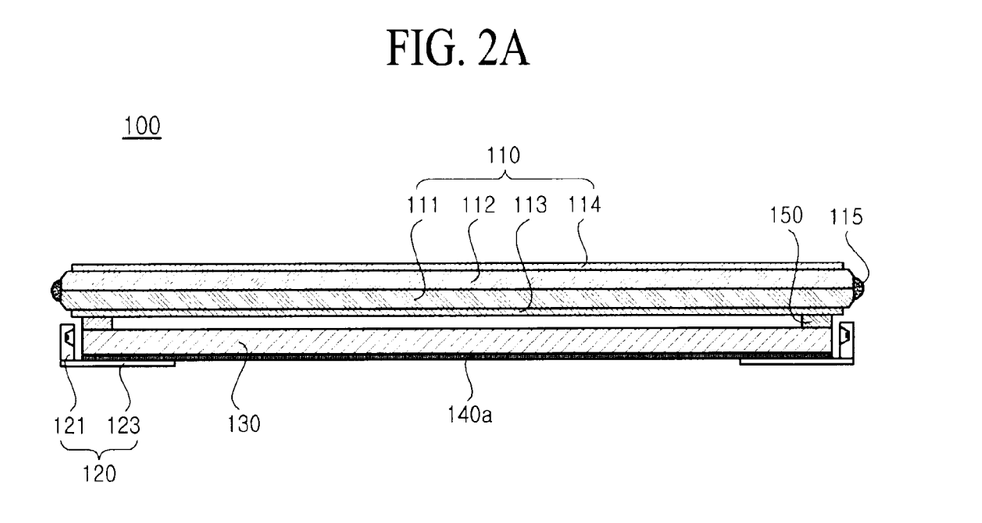
FIGS. 2A-2C are cross-sectional views illustrating a display device according to an embodiment of the present invention.
Figure 2B:
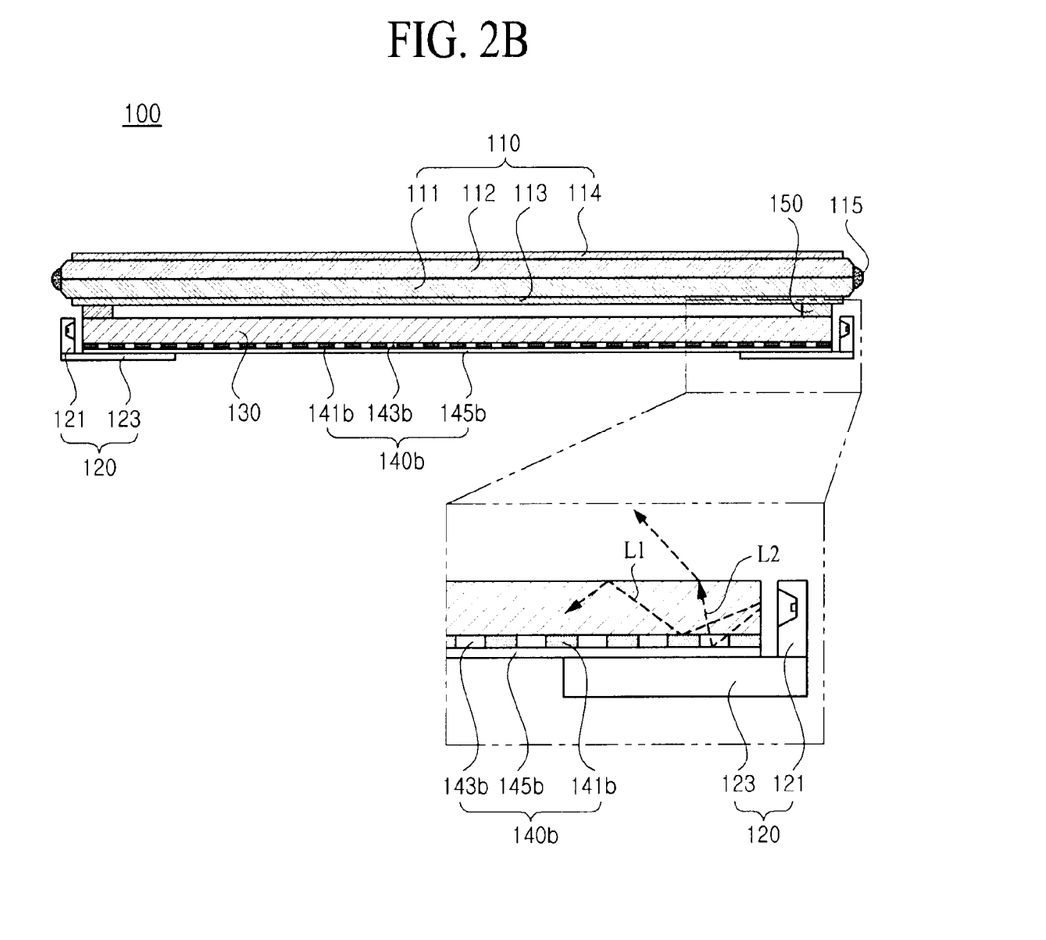
Figure 2C:
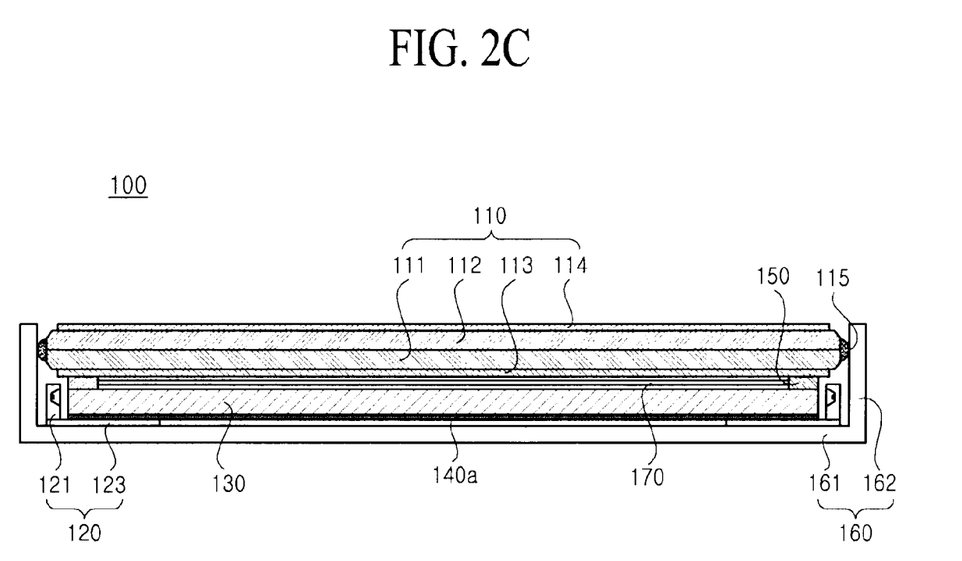

FIGS. 2A-2C are cross-sectional views illustrating a display device 100 according to an embodiment of the present invention. In detail, the display device 100 according to an embodiment of the present invention may include a liquid crystal panel 110, a light source 120, a light guide 130, a reflector 140a, and an adhesive member 150.

In detail, in FIG. 2A the liquid crystal panel 110 includes a first substrate 111, a second substrate 112, and a liquid crystal layer (not shown) formed between the first and second substrates 111 and 112.

On the first substrate 111, there are signal lines of gate and data lines, and a thin film transistor (TFT) formed adjacent to a crossing portion of the gate and data lines.

Also, a pixel electrode is formed in a pixel region defined by crossing the gate and data lines, and a pad region is formed at one side of the first substrate 111, wherein the pad region is connected with each of the gate and data lines.

According as a tape carrier package (not shown), on which a driver integrated circuit for applying a driving signal to the TFT is mounted, is attached to the pad region, a data signal is supplied to the data line from the driver integrated circuit, and a scan signal is supplied to the gate line from the driver integrated circuit.

On the second substrate 112, there are a color filter (not shown), a common electrode (not shown), and a black matrix (not shown).

A first polarizing member 113 is formed on a lower surface of the first substrate 111, wherein the first polarizing member 113 polarizes light which is provided from the light source 120 and passes through the light guide 130.

A second polarizing member 114 is formed on an upper surface of the second substrate 112, wherein the second polarizing member 114 enables a user to watch an image.

According as the light provided from the light source 120 passes through the liquid crystal layer (not shown), an image is displayed on the liquid crystal panel 110.

In addition, side sealing portions 115 may be formed along the circumference of the liquid crystal panel 110, that is, both lateral sides of the liquid crystal panel 110, thereby preventing the liquid crystal panel 110 from being damaged by an external shock, and preventing a light leakage.

As shown in FIG. 2A, the light source 120 provides the light toward the liquid crystal panel 110.

In detail, the light source 120 may include a plurality of LED packages 121, and a power supply member 123.

The power supply member 123 is provided with a receiving area to be combined with the plurality of LED packages 121. Except the receiving area, the remaining areas of the power supply member 123 are combined with a rear surface of the light guide 130.

In an embodiment of the present invention, the light source 120 is combined with the light guide 130 through the power supply member 123. However, the plurality of LED packages 121 and the light guide 130 may be combined by providing an epoxy, silicon or acryl material in between and forming a transparent adhesive member whose refractive index is not less than '1'.

Preferably, the light source 120 is combined with one side of the light guide 130, and the light guide 130 is formed of a glass material so that the light provided from the light source 120 is guided toward the liquid crystal panel 110.

In detail, the light guide 130 is formed of the glass material containing silicon (Si) compound. According to a selection of those skilled in the art, the light guide 130 may be formed of soda lime glass, borosilicate glass, or quartz glass.

The reflector 140*a* may be formed on at least any one of front and rear surfaces of the light guide 130.

In detail, the reflector 140*a* may be formed of alloy (MoTi) of molybdenum and titanium, or alloy (AlNd) of aluminum and neodymium. As shown in FIG. 2A, the reflector 140*a* according to an embodiment of the present invention is formed on the other surface (rear surface) of the light guide 130, preferably.

According as the reflector 140*a* is provided on the rear surface of the light guide 130 formed of the glass material, the light which is incident on the light guide 130 is again reflected toward the liquid crystal panel 110. The reflector 140*a* may be a metal plate.

As shown in FIG. 2B, a reflector 140*b* according to a modified embodiment may include a first reflection member 141*b*, a plurality of pattern holes 143*b*, and a second reflection member 145*b*.

The first reflection member 141*b*, which is formed on the rear surface of the light guide 130, regularly reflects light (L1) being incident on the light guide 130.

The plurality of pattern holes 143*b* are formed inside the first reflection member 141*b*. In order to provide the light being incident on the light guide 130 toward the second reflection member 145*b*, it is preferable that the pattern hole 143*b* be formed of a hollow hole.

The second reflection member 145*b* is formed of a material with white, and is formed on the rear surface of the first reflection member 141*b*, to thereby completely cover the first reflection member 141*b*. Accordingly, light (L2), which is incident on the second reflection member 145*b* through the plurality of pattern holes 143*b*, is scattered and reflected by the second reflection member 145*b*, whereby the light (L2) proceeds toward the liquid crystal panel 110.

The adhesive member 150 is formed on one surface of the light guide 130, to thereby combine the liquid crystal panel 110 and the light guide 130 with each other.

Preferably, as shown in FIG. 2, the adhesive member 150 is formed of a sealant of black-colored silicon material which prevents surrounding air from flowing into the inside of the display device 100 through a gap between the liquid crystal panel 110 and the light guide 130, and enhances an adhesive strength between the liquid crystal panel 100 and the light guide 130.

The adhesive member 150 according to an embodiment of the present invention may be selected from OCA (Optical Clear Adhesive) of optical transparent adhesive, both-sided tape, or foam pad having both sides coated with an adhesive material.

As shown in FIG. 2C, the display device according an embodiment of the present invention may further include a lower cover 160, and a plurality of optical members 170.

In detail, the lower cover 160 may include a lower plate 161 for preparing a space to receive the liquid crystal panel 110, the light source 120 and the light guide 130 therein, and a sidewall plate 162 vertically bent from the lower plate 161 in a direction of the liquid crystal panel 110. The lower cover 160 is combined with the other surface of the light guide 130, that is, the rear surface of the light guide 130.

The lower cover 160 protects the liquid crystal panel 110 and the light guide 130 from external shocks and foreign matters.

As the plurality of optical members 170 are provided between the liquid crystal panel 110 and the light guide 130, it is possible to diffuse and concentrate the light provided from the light guide 130 to the liquid crystal panel 110, thereby improving uniformity of luminance.

Figure 3:
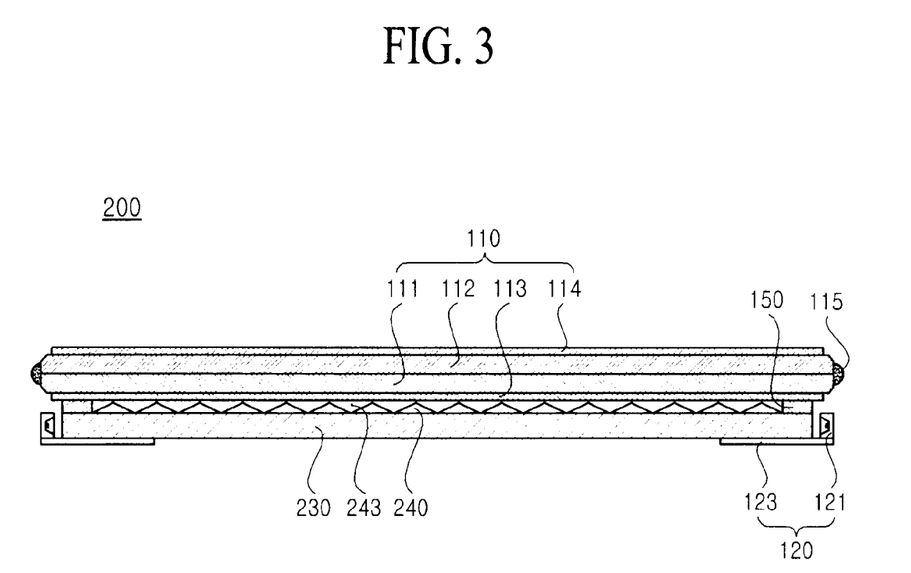
FIG. 3 is a cross-sectional view illustrating a display device according to another embodiment of the present invention.

FIG. 3 is a cross sectional view illustrating a display device 200 according to another embodiment of the present invention, and FIGS. 4A-4D are perspective views illustrating various examples of reflector shown in FIG. 3.

Hereinafter, the display device 200 according to another embodiment of the present invention will be described in detail, and a detailed explanation for the same structures as those of the above embodiment of the present invention will be omitted.

As shown in FIG. 3, the display device 200 according to another embodiment of the present invention may include a liquid crystal panel 110, a light source 120, a light guide 230, a reflector 240, and an adhesive member 150. The reflector 240 with an optical pattern is formed on one surface of the light guide 230 confronting the liquid crystal panel 110, that is, an upper surface of the light guide 230.

Figure 4A:
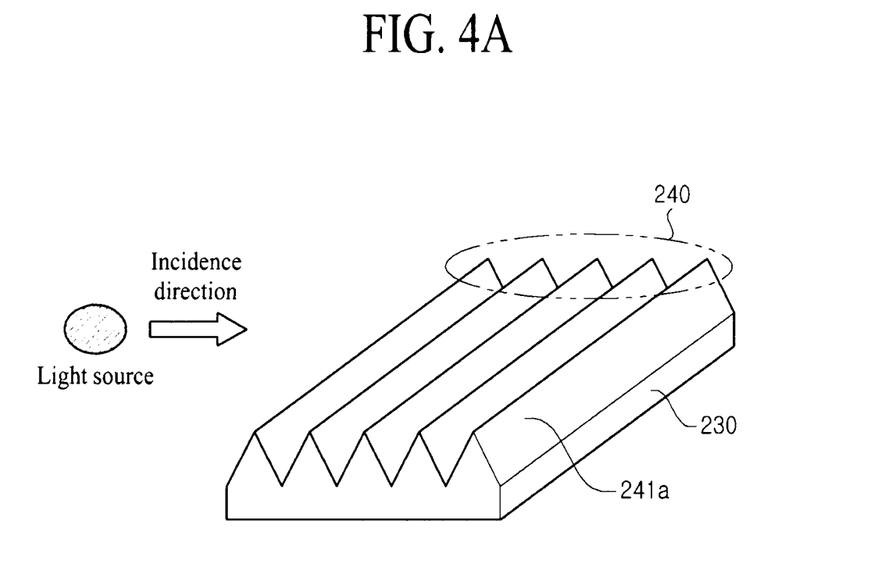
FIGS. 4A-4D are perspective views illustrating various examples of reflector shown in FIG. 3.

As shown in FIG. 4A which shows various examples of the optical pattern of the reflector 240, the reflector 240 may be provided on the upper surface of the light guide 230, and may be formed of a prism pattern 241*a*.

Figure 4B:
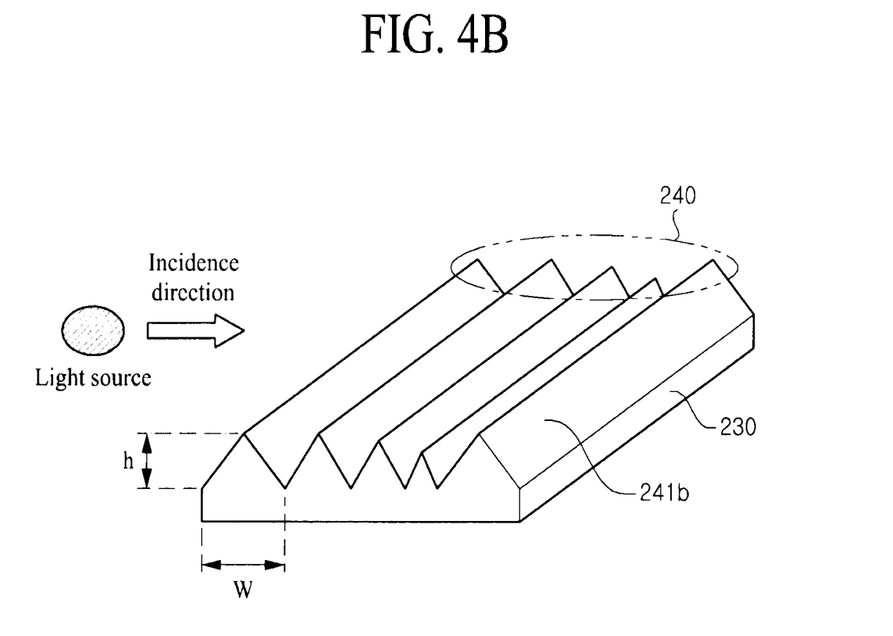
Figure 4C:
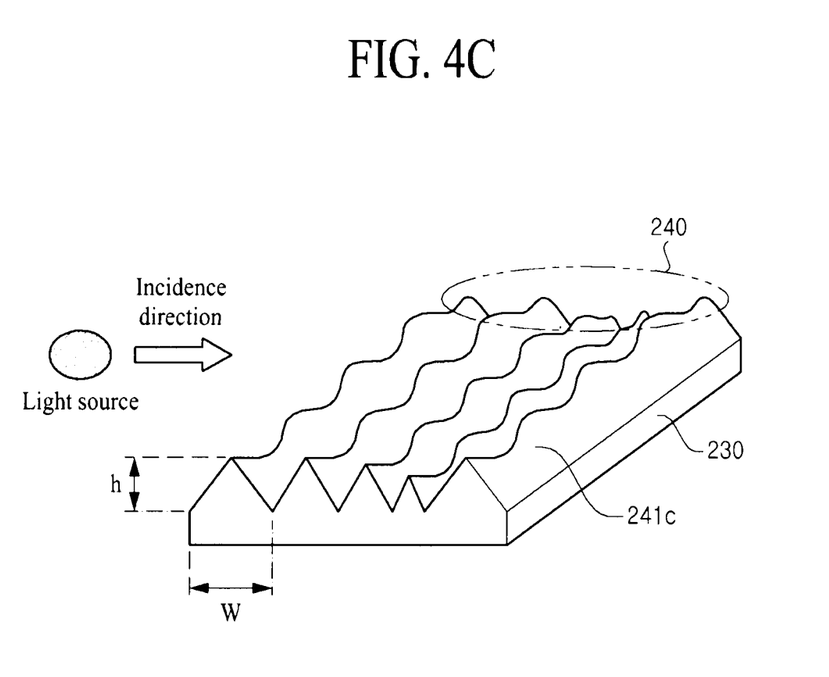
Figure 4D:
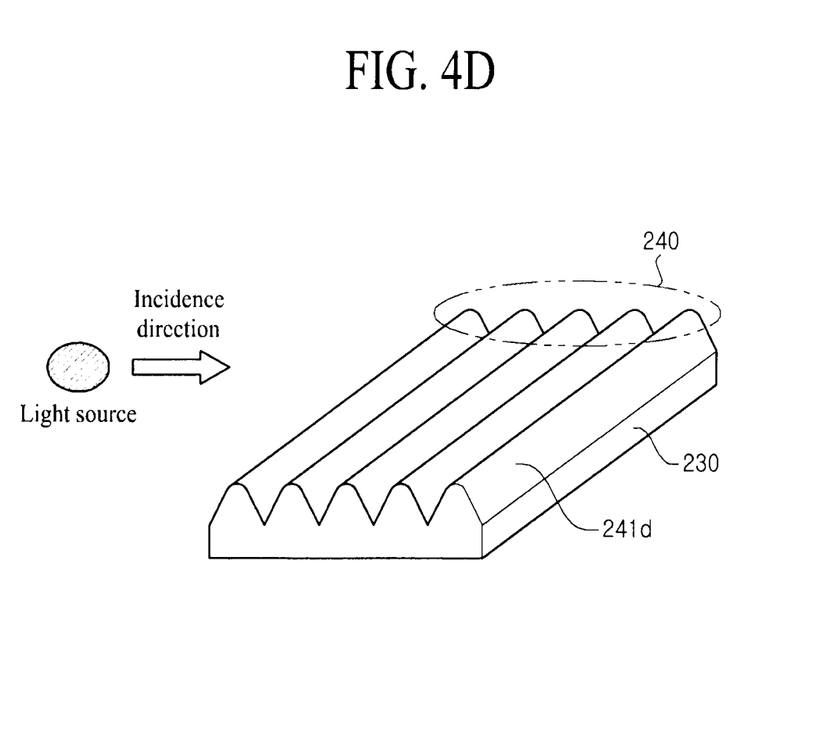

Also, as shown in FIG. 4B, the reflector 240, which is provided on the upper surface of the light guide 230, may be formed of a prism pattern 241*b* with different heights (h) and different widths (w). As shown in FIG. 4C, the reflector 240 may be formed in a wave pattern 241*c* with different heights (h) and different widths (w). As shown in FIG. 4D, the reflector 240 may be formed of a prism pattern 24*ad* with round-shaped vertex.

In addition to the various optical patterns 241*a*, 241*b*, 241*c* and 241*d* shown in FIGS. 4A to 4D, the reflector 240 may be formed in various optical patterns and provided on the upper surface of the light guide 230.

In order to form the reflector 240 with the optical pattern on the upper surface of the light guide 230 of the glass material, the optical pattern of the reflector 240 may be obtained by deposition and photo exposure process or etching process.

Accordingly, a certain gap is maintained between the liquid crystal panel 110 and the light guide 230 owing to the reflector 240 with the optical pattern formed on the upper surface of the light guide 230, thereby forming a medium layer (air layer) 243.

Figure 5A:
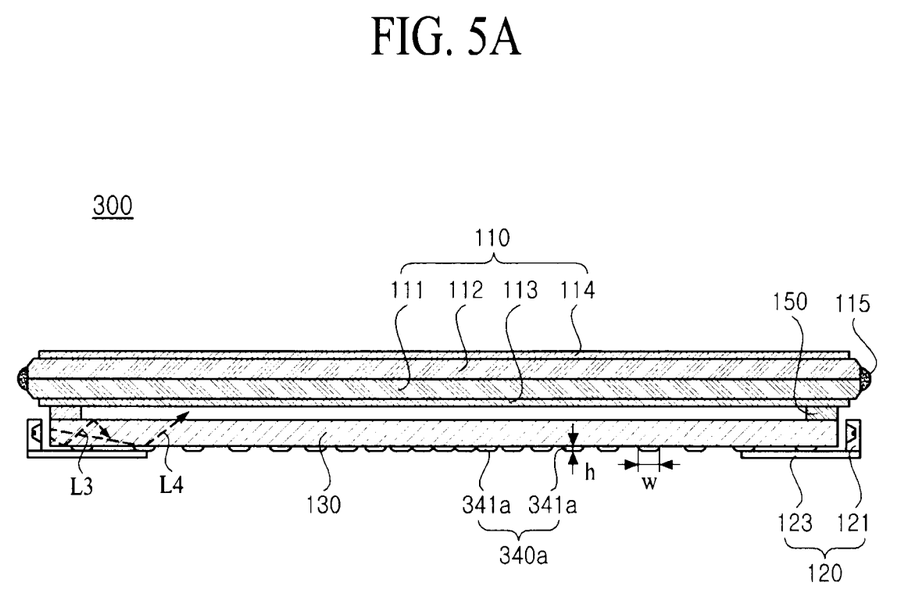
FIGS. 5A and 5B are cross-sectional views illustrating a display device according to another embodiment of the present invention.
Figure 5B:
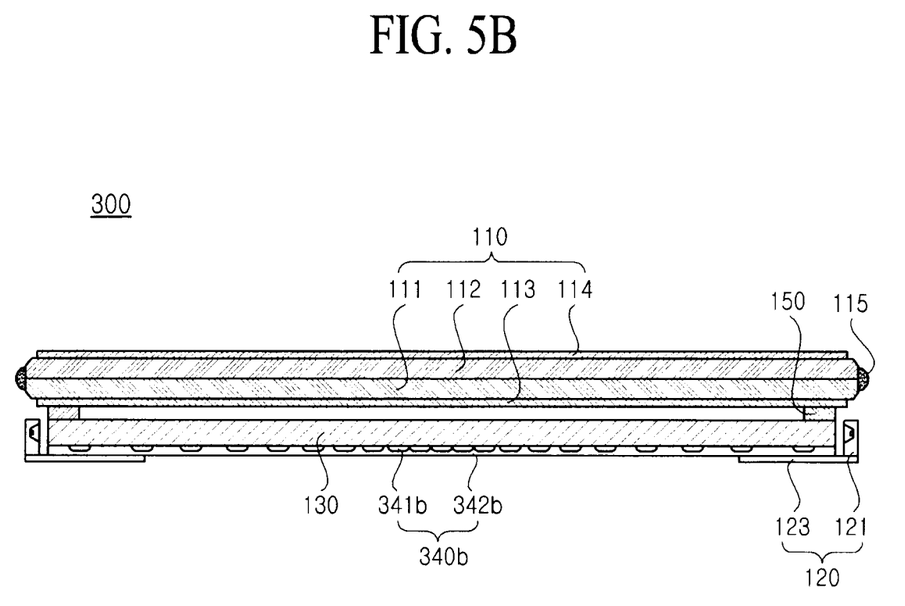

FIGS. 5A-5B are cross-sectional views illustrating a display device 300 according to another embodiment of the present invention.

Hereinafter, the display device 300 according to another embodiment of the present invention will be described in detail, and a detailed explanation for the same structures as those of the above embodiment of the present invention will be omitted.

As shown in FIG. 5A, the display device 300 according to another embodiment of the present invention may include a liquid crystal panel 110, a light source 120, a light guide 130, a reflector 340a, and an adhesive member 150.

In detail, as shown in FIG. 5A, the reflector 340a is provided with a plurality of reflection patterns 341a of an organic material.

As shown in FIG. 5B, a reflector 340b according to a modified embodiment may be provided with a plurality of reflection patterns 341b and a reflection member 342b.

Referring once again to FIG. 5A, the reflector 340a including the plurality of reflection patterns 341a of the organic material may be formed on at least any one of front and rear surfaces of the light guide 130. According to another embodiment of the present invention, the reflector 340a may be formed on the other surface (rear surface) of the light guide 130.

The plurality of reflection patterns 341a may be formed on only one surface (upper surface) of the light guide 130 confronting the liquid crystal panel 110, may be formed on only the other surface (rear surface) of the light guide 130, or may be formed on both the upper surface and the rear surface of the light guide 130.

In order to form the reflector 340a of the organic material on the upper surface of the light guide 130 of the glass material, the plurality of reflection patterns 341a may be obtained by deposition and photo exposure process or etching process.

A width (w) in each of the reflection patterns 341a for forming the reflector 340a may be selectively formed within a range of 2 μm~100 μm, and a height (h) in each of the reflection patterns 341a for forming the reflector 340a may be selectively formed within a range of 2 μm~100 μm.

As shown in FIG. 5A, the light source 120 is formed at each of both ends of the light guide 130. Preferably, the plurality of reflection patterns 341a are provided in such a manner that they become more compact in the center of the light guide 130 in comparison to an area adjacent to each end of the light guide 130.

Supposing that the light source 120 is formed at any one of both sides of the light guide 130. The more the reflection patterns 341a are positioned away from the light source 120, the more compact they are.

According to another embodiment of the present invention, a path of light provided from the light source 120 will be described with reference to FIG. 5A. The light (L3) provided from the light source 120 proceeds to the inside of the light guide 130, wherein some light (L4) proceeds to the reflection pattern 341a. In this case, the light (L4) proceeding to the inside of the reflection pattern 341a is totally reflected on the inside of the reflection pattern 341a, whereby the light proceeds to the liquid crystal panel 110.

According as the reflector 340a including the plurality of reflection patterns 341a of the organic material is combined with the light guide 130, it functions as the optical sheet of the related art LCD device.

Referring once again to FIG. 5B, the reflector 340b according to the modified embodiment may be provided with the plurality of reflection patterns 341b and the reflection member 342b.

Preferably, the reflection member 342b is formed on the other surface (rear surface) of the light guide 130 to cover the entire area of the plurality of reflection patterns 341b. The reflection member 342b may be formed of a metal compound of any one of MoTi or AlNd. Thus, the light which is incident toward the inside of the light guide 130 may be regularly reflected toward the liquid crystal panel 110 by the use of reflection member 342b, or may be scattered and reflected toward the liquid crystal panel 110 by the use of reflection member 342b.

In the same manner as the above reflector 140b shown in FIG. 2B, the reflection member 342b may include a first reflection member, a plurality of pattern holes, and a second reflection member.

Figure 6A:
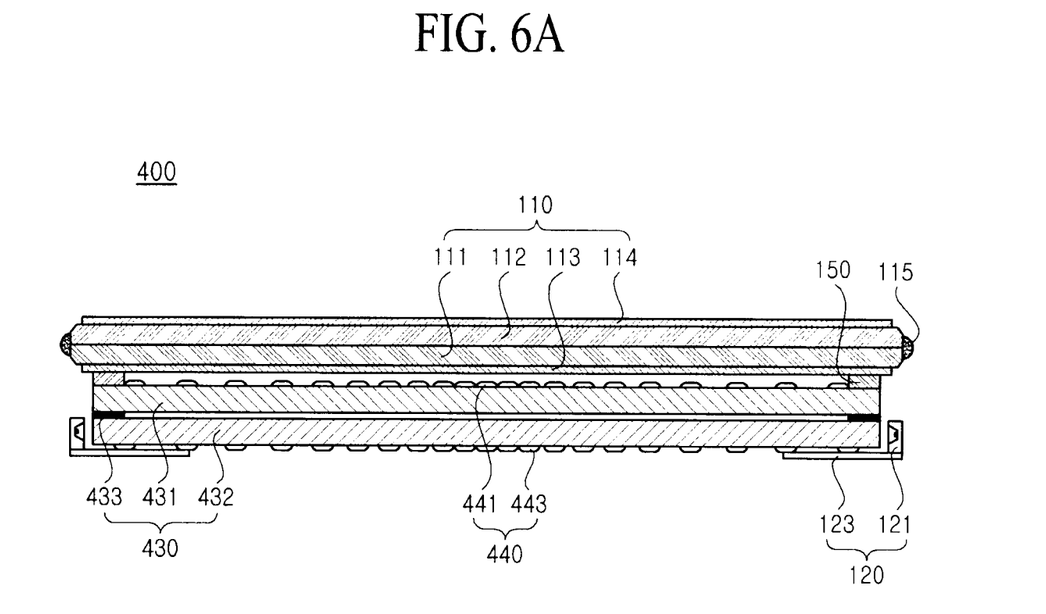
FIGS. 6A and 6B are cross-sectional views illustrating a display device according to another embodiment of the present invention.
Figure 6B:
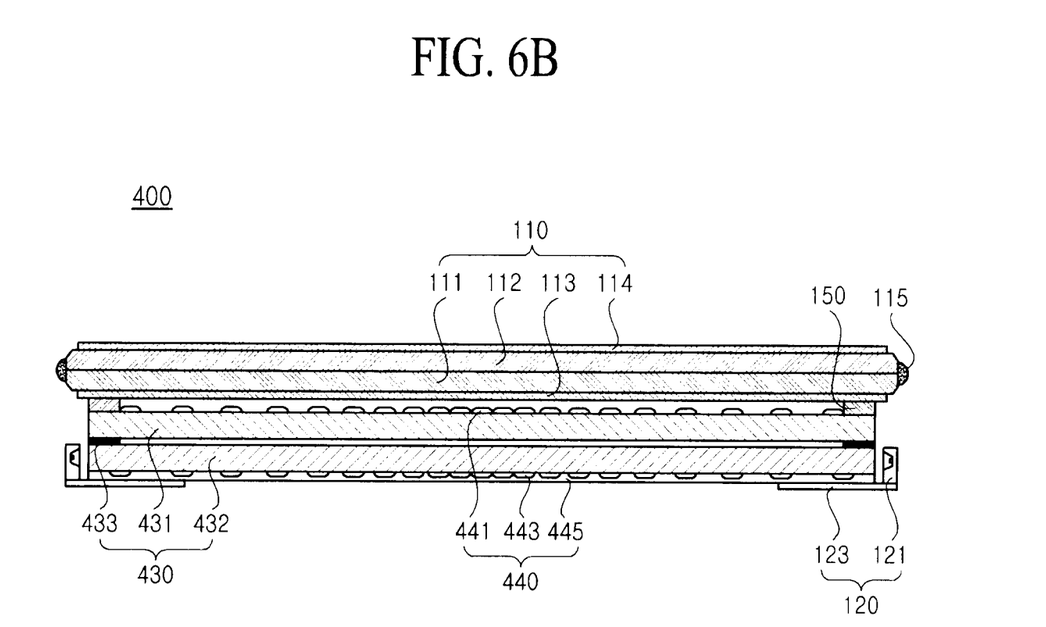

FIGS. 6A and 6B are cross-sectional views illustrating a display device 400 according to another embodiment of the present invention.

Hereinafter, the display device 400 according to another embodiment of the present invention will be described in detail, and a detailed explanation for the same structures as those of the above embodiment of the present invention will be omitted.

As shown in FIG. 6A, the display device 400 may include a liquid crystal panel 110, a light source 120, a plurality of light guides 430, a reflector 440, and an adhesive member 150.

In detail, the plurality of light guides 430 are formed of a glass material, and the plurality of light guides 431 include a first light guide member 431 and a second light guide member 432.

The first light guide member 431 is combined with a lower surface of the liquid crystal panel 110, and the adhesive member 150 is combined with one surface of the first light guide member 431 confronting the liquid crystal panel 110, that is, an upper surface of the first light guide member 431.

Also, the second light guide member 432 is combined with a lower surface of the first light guide member 431, and the light source 120 is combined with any one of both ends of the second light guide member 432. In FIG. 6A showing another embodiment of the present invention, the light source 120 is combined with each of both ends of the second light guide member 432.

The first light guide member 431 and the second light guide member 432 may be combined with each other by the use of adhesive member 433, OCA (Optical Clear Adhesive) of optical transparent adhesive, both-sided tape, or foam pad having both surfaces coated with an adhesive material.

Referring once again to FIG. 6A, the reflector 440 may include a plurality of first reflection patterns 441 and a plurality of second reflection patterns 443.

The plurality of first reflection patterns 441 may be formed on at least any one of lower and upper surfaces of the first light guide member 431. According to another embodiment of the present invention, the plurality of first reflection patterns 441 may be formed on one surface of the first light guide member 431, that is, an upper surface of the first light guide member 431. According as the plurality of first reflection patterns 441 are combined with the first light guide member 431, it functions as the optical sheet such as diffusion sheet or prism sheet to diffuse and concentrate the light.

The plurality of second reflection patterns 443 may be formed on at least any one of front and rear surfaces of the second light guide member 432. According to another embodiment of the present invention, the plurality of second reflection patterns 443 may be formed on the other surface of the second light guide member 432, that is, the rear surface of the second light guide member 432. According as the plurality of second reflection patterns 443 are combined with the second light guide member 432, it functions as the light guide plate (LGP) as well as the optical sheet such as diffusion sheet or prism sheet to diffuse and concentrate the light.

As shown in FIG. 6B, the reflector 440 may further include a reflection member 455 as well as the plurality of first reflection patterns 441 and the plurality of second reflection patterns 443.

In detail, the reflection member 445 shown in FIG. 6B is identical in structure and function to the above reflector 140 shown in FIG. 2A. That is, the reflection member 445 shown in FIG. 6B is formed on the other surface (rear surface) of the second light guide member 432 to cover the entire area of the plurality of second reflection patterns 443. The reflection member 445 may be formed of a metal compound of any one of MoTi or AlNd.

In the same manner as the above reflector 140b shown in FIG. 2B, the reflection member 445 may include a first reflection member, a plurality of pattern holes, and a second reflection member.

Figure 7A:
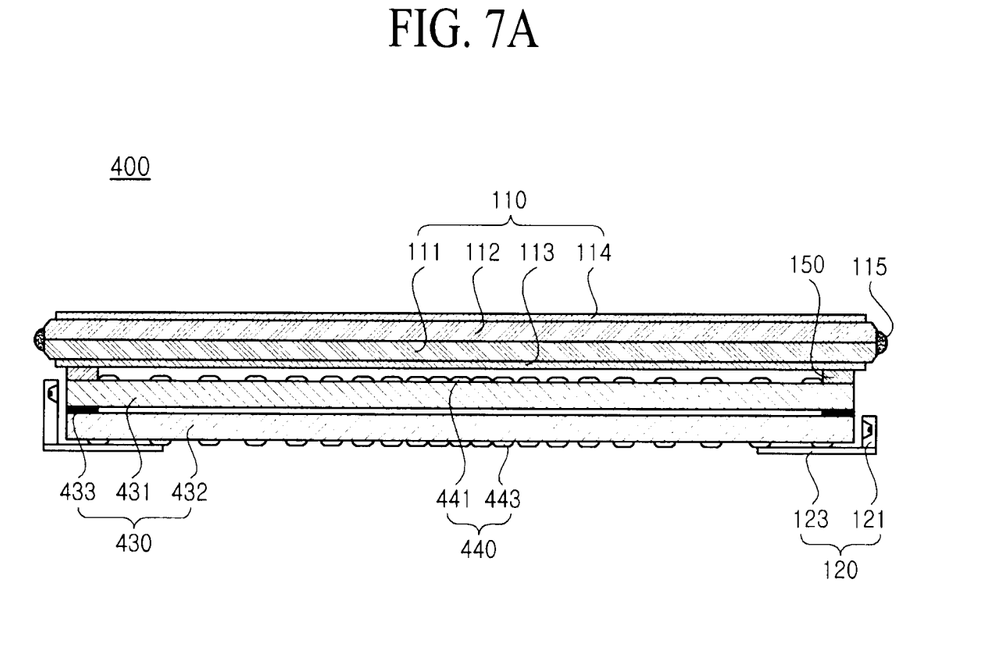
FIGS. 7A and 7B are cross-sectional views illustrating various examples of combination position of light source shown in FIGS. 6A and 6B.
Figure 7B:
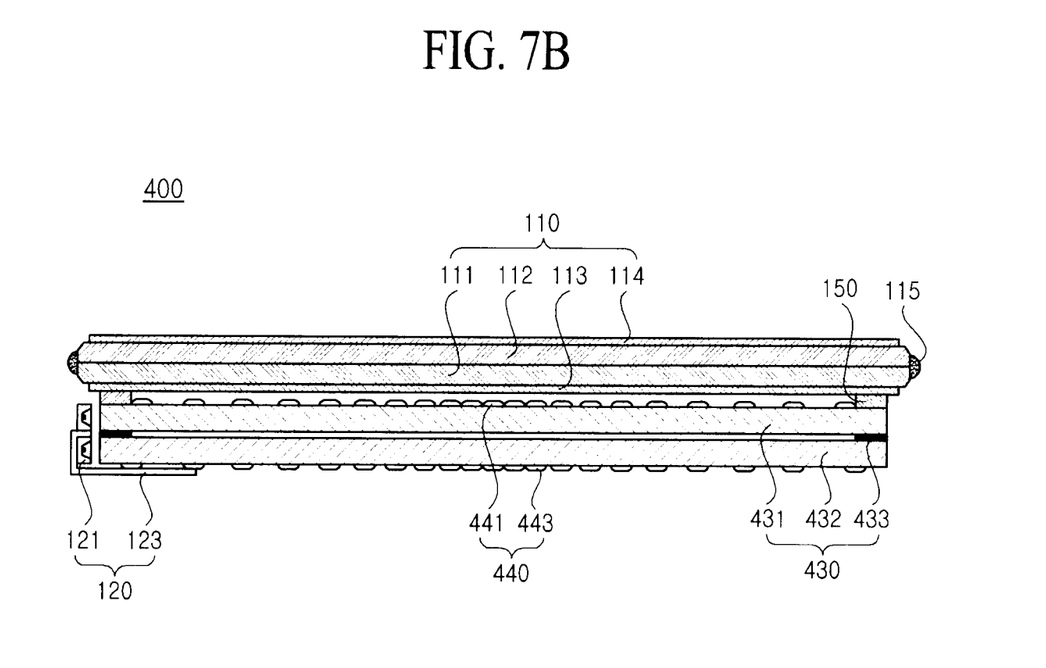

FIGS. 7A and 7B illustrate various examples of the combination position of light source according to the embodiments of the present invention, the light source 120 may be combined with at least any one of the first and second light guide members 431 and 432.

In detail, the light sources 120 may be provided at different sides of the respective first and second light guide members 431 and 432. As shown in FIG. 7A, when one of the light sources 120 is provided at one side of the first light guide member 431, and the other light source 120 is provided at the other side of the second light guide member 432. Thus, the light sources 120 are respectively combined with one side of the first light guide member 431 and the other side of the second light guide member 432 so that the light is provided from the light sources 120 obliquely facing each other.

Also, the light sources 120 may be provided at the same sides of the respective first and second light guide members 431 and 432. As shown in FIG. 7B, when one of the light sources 120 may be provided at one side of the first light guide member 431, and the other light source 120 may be provided at one side of the second light guide member 432. Thus, the light sources 120 are respectively combined with one side of the first light guide member 431 and one side of the second light guide member 432 so that it is possible to provide the light toward the same direction.

In the same manner as the embodiment shown in FIG. 2C, the display device 400 may further include a lower cover and a plurality of optical members.

According to the embodiments of the present invention, it is possible to realize the display device with slimness and narrowness by removing the structures such as case top, guide panel and cover bottom, and forming the liquid crystal panel and the light guide as one body.

Also, the display device according to the present invention is decreased in its manufacturing cost and weight owing to the removal of various structures.

In addition, the reflector which substitutes for the optical sheets of the related art LCD device is used in the display device according to the embodiment of the present invention, to thereby realize the slimness and narrowness in the display device according to the embodiment of the present invention.

Also, the display device according to the present invention uses the light guide member of the glass material for guiding the light to the liquid crystal panel, thereby preventing thermal deformation by the light source, and improving light efficiency.

Also, as the optical sheet is selectively combined between the liquid crystal panel and the light guide, it is possible to improve use efficiency of light provided from the light source to the liquid crystal panel.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A display device comprising:
   a liquid crystal panel;
   a light source for providing light to the liquid crystal panel;
   a light guide of a glass material, wherein light from the light source is incident to a side of the light guide;
   an adhesive member directly contacting a surface of the light guide facing the liquid crystal panel and a surface of the liquid crystal panel to bond the light guide and the liquid crystal panel to each other; and
   a reflector on a surface of the light guide not facing the liquid crystal panel, the reflector comprising:
      a first reflection member of a metal compound for reflecting light incident on the light guide;
      a plurality of equally spaced hollow pattern holes in the first reflection member; and
      a second reflection member of a white material to completely cover the first reflection member and for scattering and reflecting light through the plurality of hollow pattern holes toward the liquid crystal panel.

2. The display device of claim 1, wherein the first reflector member includes a metal compound of one of MoTi and AlNd.

3. The display device of claim 1, wherein the light source comprises:
   a plurality of LED packages; and
   a power supply member including a receiving area to be combined with the plurality of LED packages,
   wherein the power supply member is combined with a rear surface of the light guide.

4. The display device of claim 3, wherein the light source and the light guide are combined with an epoxy, silicon, or acryl material in between and forming a transparent adhesive with a refractive index not less than 1.

5. A display device comprising:
   a liquid crystal panel;
   a light source for providing light to the liquid crystal panel;
   a light guide of a glass material, wherein light from the light source is incident to a side of the light guide;
   an adhesive member directly contacting a surface of the light guide facing the liquid crystal panel and a surface of the liquid crystal panel to bond the light guide and the liquid crystal panel to each other; and
   a reflector on a surface of the light guide, the reflector comprising:
      a first reflection member of an organic material in a pattern more compact in a center of the light guide than an area adjacent to an end of the light guide for reflecting light incident on the light guide; and a second reflection member of a metal compound to completely cover the first reflection member and for scattering and reflecting light toward the liquid crystal panel through the first reflection member.

6. The display device of claim 5, wherein the first reflector member includes an optical pattern on a surface of the light guide facing the liquid crystal panel.

7. The display device of claim 5, wherein the reflector includes a plurality of reflection patterns of the organic material.

8. The display device of claim 7, wherein the reflector further includes a reflection member on a surface of the light guide not facing the liquid crystal panel.

9. The display device of claim 8, wherein the reflection member includes a metal compound of one of MoTi and AlNd.

10. A display device comprising:
a liquid crystal panel;
a light source for providing light to the liquid crystal panel;
a plurality of light guides of a glass material, wherein light from the light source is incident to a side of one of the plurality of light guides;
a first adhesive member directly contacting a surface of a first light guide closest to the liquid crystal panel and a surface of the liquid crystal panel to bond the first light guide to the liquid crystal panel; and
a reflector on a surface of the plurality of light guides, the reflector comprising:
on the first light guide, a first reflection member of an organic material in a plurality of patterns that are more closely together in a center of the light guide than an area adjacent to an end of the first light guide;
on a second light guide, a second reflection member of an organic material in a plurality of patterns that are more closely together in a center of the light guide than an area adjacent to an end of the second light guide; and
a third reflection member of a metal compound to completely cover the second reflection member and for scattering and reflecting light toward the liquid crystal panel through the first reflection member.

11. The display device of claim 10, wherein the plurality of light guides comprise:
the first light guide bonded to the liquid crystal panel; and
the second light guide bonded to a surface of the first light guide with a second adhesive member.

12. The display device of claim 10, wherein the second reflection member is on a surface of the second light guide not facing the liquid crystal panel.

13. The display device of claim 12, wherein the third reflection member includes a metal compound of any one of MoTi and AlNd.

14. The display device of claim 10, wherein the light source comprises:
a plurality of LED packages; and
a power supply member including a receiving area to be combined with the plurality of LED packages,
wherein the power supply member is combined with a rear surface of one of the plurality of light guides.

15. The display device of claim 14, wherein light from a first portion of the plurality of LED packages is incident on a side of the first light guide and light from a section portion of the LED packages is incident on a side of a second light guide.

16. The display device of claim 15, wherein light from the first portion of the plurality of LED packages is incident on a side of the first light guide opposite to a side of the second light guide in which light from the second portion of LED packages is incident.

\* \* \* \* \*